US005798492A

United States Patent [19]
Enya et al.

[11] Patent Number: 5,798,492
[45] Date of Patent: Aug. 25, 1998

[54] MACHINING LIQUID PROCESSING UNIT IN ELECTRIC DISCHARGE MACHINE

[75] Inventors: Toshihiro Enya; Hidetoshi Kawatsu, both of Tokyo, Japan

[73] Assignee: Mitsubishi Denki Kabushiki Kaisha, Tokyo, Japan

[21] Appl. No.: 697,722

[22] Filed: Aug. 29, 1996

[30] Foreign Application Priority Data

Oct. 13, 1995 [JP] Japan .................. 7-265981

[51] Int. Cl.⁶ .................................. B23H 1/10
[52] U.S. Cl. .................. 219/69.14; 210/421
[58] Field of Search ............. 219/69.14; 210/418, 210/419, 420, 421

[56] References Cited

U.S. PATENT DOCUMENTS

| | | | |
|---|---|---|---|
| 5,013,432 | 5/1991 | Martinez-Mugica | 219/69.14 |
| 5,031,650 | 7/1991 | Nagata et al. | 210/421 |
| 5,189,276 | 2/1993 | Magara | 219/69.14 |
| 5,243,168 | 9/1993 | Wada et al. | 219/69.14 |

FOREIGN PATENT DOCUMENTS

| | | |
|---|---|---|
| 1175129 | 12/1989 | Japan . |
| A230423 | 1/1990 | Japan . |
| 3103124 | 10/1991 | Japan . |
| A4111721 | 4/1992 | Japan . |
| A663825 | 3/1994 | Japan . |
| A6320342 | 11/1994 | Japan . |
| 723139 | 5/1995 | Japan . |

Primary Examiner—Geoffrey S. Evans
Attorney, Agent, or Firm—Sughrue, Mion, Zinn, Macpeak & Seas, PLLC

[57] ABSTRACT

In a machining liquid processing unit in an electric discharge machine selectively using two types of machining liquid of a first machining liquid not containing therein powder material and a second machining liquid containing conductive powder material mixed therein, a movable shooter is movably provided between a first position where a machining liquid is flown to a first storage section in a machining liquid vessel and a second position where a machining liquid is flown to a second storage section, and the machining liquid discharged from a machining liquid discharge port formed in the machining liquid vessel in an electric discharge machine is selectively flown to either of the first storage section or the second storage section by the movable shooter.

7 Claims, 9 Drawing Sheets

MACHINING LIQUID PROCESSING UNIT IN ELECTRIC DISCHARGE MACHINE

FIELD OF THE INVENTION

The present invention relates to a machining liquid processing unit in an electric discharge machine, and more particularly to a machining liquid processing unit in an electric discharge machine selectively using two types of machining liquid or using a machining liquid containing conductive powder material mixed therein.

BACKGROUND OF THE INVENTION

Figure 9:
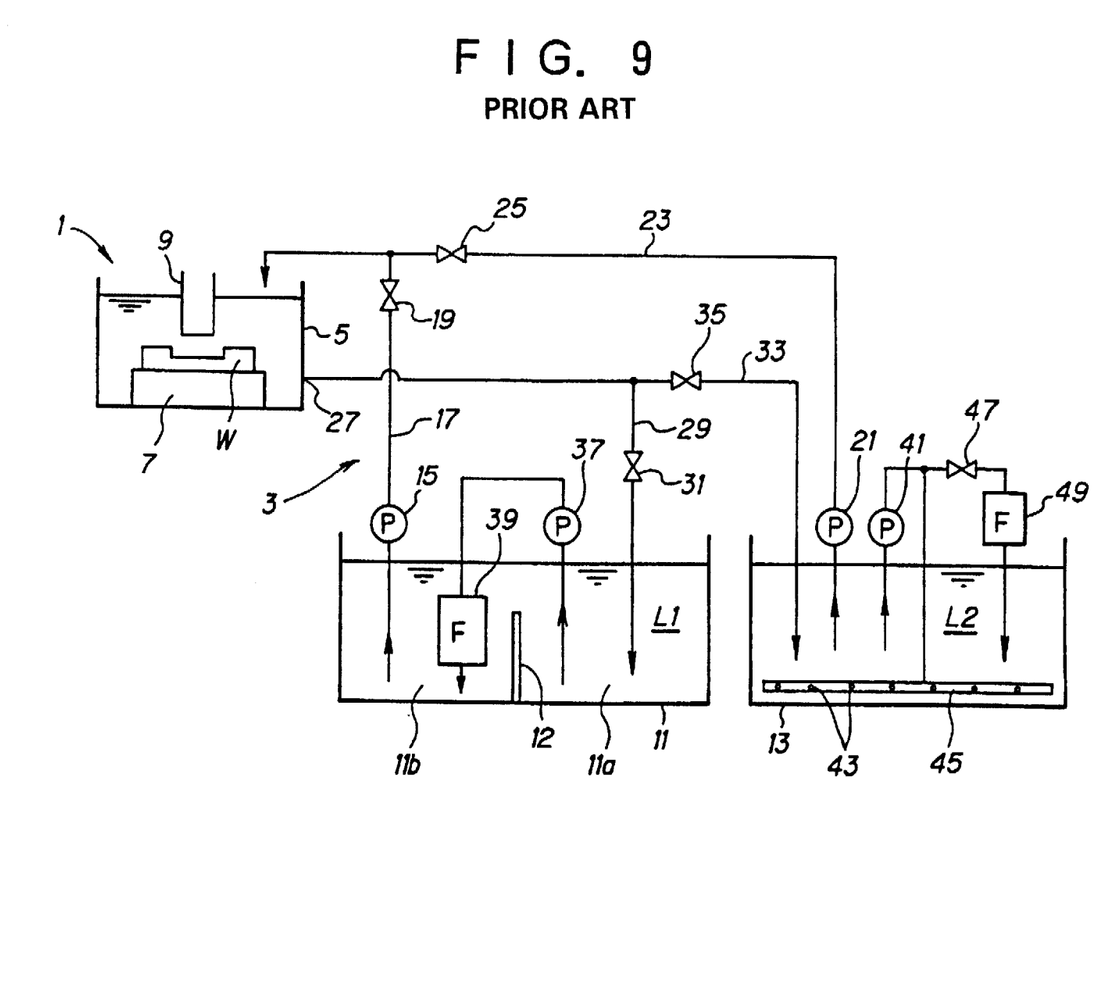
FIG. 9 is a general diagram showing a conventional type of a machining liquid processing unit in an electric discharge machine.

FIG. 9 shows a conventional type of a machining liquid processing unit in an electric discharge machine selectively using two types of machining liquid. In the figure, designated at the reference numeral 1 is an electric discharge machine, and at 3 a machining liquid processing unit attached to the electric discharge machine 1.

The electric discharge machine 1 comprises a table 7 for machining provided in a machining liquid vessel 5 and on which a work W is placed, and an electrode 9 for a tool provided opposite to the work W placed on the table 7 for machining, and electric discharge machining is executed in the machining liquid filled in the machining liquid vessel 5.

The machining liquid processing unit 3 is divided with an internal partition plate 12 to a contaminated liquid vessel 11a and a clean liquid vessel 11b, and comprises a first machining liquid tank 11 for storing a first machining liquid L1 which is a base heating oil not containing powder material; a second machining liquid tank 13 for storing a second machining liquid L2 which is a base heating oil containing conductive powder material mixed therein; a pump 15 for sucking up the first machining liquid L1 from the clean liquid vessel 11b of the first machining liquid tank 11; an open/close valve 19 provided on a machining liquid supplying path 17 for conveying the first machining liquid L1 from the pump 15 to the machining liquid vessel 5; a pump 21 for sucking up the second machining liquid L2 from the second machining liquid tank 13; an open/close valve 25 provided on a machining liquid supplying path 23 for conveying the second machining liquid L2 from the pump 21 to the machining liquid vessel 5; an open/close valve 31 provided on a machining liquid returning path 29 for returning a machining liquid discharged from a machining liquid discharge port 27 in the machining liquid vessel 5 to the contaminated liquid vessel 11a in the first machining liquid tank 11; and an open/close valve 35 provided on a machining liquid returning path 33 for returning a machining liquid discharged from a machining liquid discharge port 27 in the machining liquid vessel 5 to the second machining liquid tank 13.

Provided in the first machining liquid tank 11 are a pump 37 for sucking up the first machining liquid L1 from the contaminated liquid vessel 11a, and a filter 39 for filtering the first machining liquid L1 given thereto from the pump 37 and for returning the machining liquid to the clean liquid vessel 11b.

Provided in the second machining liquid tank 13 are a pump 41 for sucking up the second machining liquid L2 from the second machining liquid tank 13, an injection nozzle tube 45 for agitating a machining liquid provided in the bottom of the second machining liquid tank 13 and for injecting the second machining liquid L2 which is given thereto from the pump 41 from each of injection holes 43, and a filter 49 for filtering the second machining liquid L2 selectively given thereto from the pump 41 according to the open/close valve 47 and for returning it to the second machining liquid tank 13.

Figure 10:
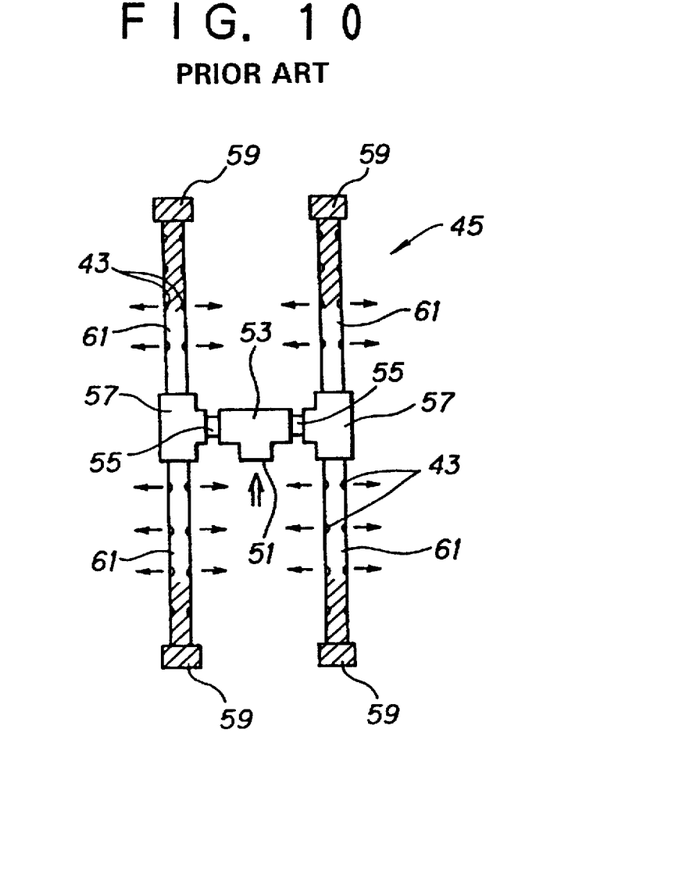
FIG. 10 is a plan view showing one example of an injection nozzle tube used in the conventional type of machining liquid processing unit in an electric discharge machine.

FIG. 10 shows detailed configuration of the injection nozzle tube 45. The injection nozzle tube 45 is formed in H-shaped with a T-shaped joint pipe 53 having a machining liquid inlet port 51, two lines of connection pipe 55 connected to each edge of the T-shaped joint pipe 53, two lines of T-shaped joint pipe 57 each connected to each of the two connection pipes 55, and four lines of pipe with injection holes 61 connected to each of the T-shaped joint pipes 57, each edge of which is closed with a plug 59.

Next, a description is made for operations of the machining liquid processing unit 3. When roughing and interstage machining are to be executed, the open/close valve 19 is opened with the open/close valve 25 closed, and a first machining liquid L1 in the clean liquid vessel 11b of the first machining liquid tank 11 is supplied by the pump 15 to the machining liquid vessel 5. During roughing and interstage machining, the first machining liquid L1 in the contaminated liquid vessel 11a is sent by the pump 37 to the filter 39, and the first machining liquid L1 is stored in the clean liquid vessel 11b by filtering and removing machining chips included therein with the filter 39.

When the roughing and interstage machining are finished, operation of the pump 15 is terminated, and the first machining liquid L1 in the machining liquid vessel 5 is discharged to the first machining liquid tank 11. In this step, the open/close valve 31 is open and the open/close valve 35 is shut.

When finishing is to be executed, the open/close valve 19 is closed with the open/close valve 25 opened, the second machining liquid L2 in the second machining liquid tank 13 is supplied by the pump 21 to the machining liquid vessel 5. During finishing, the second machining liquid L2 in the second machining liquid tank 13 is sent by the pump 41 to the injection nozzle tube 45 so that powder material in the second machining liquid L2 will not be deposited on the bottom of the second machining liquid tank 13, and the second machining liquid L2 is injected into inside of the second machining liquid tank 13 through the injection holes 43. It should be noted that the open/close valve 47 should be closed in this step.

When finishing is completed, operation of the pump 21 is terminated, and the second machining liquid L2 in the machining liquid vessel 5 is discharged to the second machining liquid tank 13. In this step, the open/close valve 35 is open and the open/close valve 31 is shut.

When an operating life of the powder material mixed in the second machining liquid L2 is over, the powder material should be replaced with new one. In this step, the open/close valve 47 is opened, the second machining liquid L2 is sent by the pump 41 to the filter 49, the powder material is filtered and removed by the filter 49, and then new powder material is inputted into the second machining liquid tank 13.

In the conventional type of a machining liquid processing unit, a machining liquid returning path 29 for returning the first machining liquid L1 to the first machining liquid tank 11 and a machining liquid returning path 33 for returning a second machining liquid L2 to the second machining liquid tank 13 are discretely provided, so that two open/close valves 31 and 35 have been required for switching the discharge liquid. To make a period of time for discharging machining liquid shorter and to reduce an amount of powder material being deposited in the machining liquid vessel 5 in the process of discharging a liquid, it is required to discharge a large amount of machining liquid, but there occur some problems such as the open/close valves 31 and 35 become larger and interference is generated during stroke movement.

Also in the conventional type of a machining liquid processing unit, machining liquid tanks 11, 13 and filters 39, 49 are required respectively for two types of machining liquid, and also there has been a possibility that machining liquid is concentrated in only one side of the machining liquid tanks due to a malfunction of an open/close valve and sometimes the machining liquid overflows from the machining liquid tank.

Also in the conventional types of a machining liquid processing unit, each edge of the pipes 61 with injection holes in the injection nozzle tube 45 is closed with a plug 59 and the machining liquid can not go out of each hole, so that powder material is deposited in each of the edge sections (the diagonally shaded areas in FIG. 10) of the pipes 61 with injection holes, whereby the injection holes 43 of the edge section thereof are closed, which makes agitation by means of injection insufficient at the edge section of each pipe 61 with injection holes and sometimes powder material is disadvantageously deposited in the portion of the machining liquid tank.

SUMMARY OF THE INVENTION

It is an object of the present invention to provide a machining liquid processing unit in an electric discharge machine, in which configuration as well as control for discharging a machining liquid are simplified due to reduction of a number of components thereof, such a danger as that a machining liquid overflows from a machining liquid tank is resolved even when a malfunction thereof occurs, agitating capability in the machining liquid tank can be improved, and a deposition of powder material in the machining liquid tank can be reduced.

In the machining liquid processing unit in an electric discharge machine according to the present invention, a machining liquid discharged from the machining liquid vessel can be directed to the first storage section or to the second storage section in the machining liquid tank only depending on the movement of movable shooter to either of the first position or the second position, so that an open/close valve for switching in discharge is not required, and by making larger a bore diameter of the machining liquid discharging pipe, a large amount of waste liquid can be discharged, and at the same time an amount of deposition of powder material in the waste in the machining liquid vessel can be reduced.

In the machining liquid processing unit in an electric discharge machine according to another aspect of the present invention, a machining liquid discharged from the machining liquid vessel can be directed to the first storage section or to the second storage section in the machining liquid tank only depending on the movement of the flexible hose to either of the first position or the second position, so that an open/close valve for switching in discharge is not required, and only by changing a bore diameter of the machining liquid discharging pipe, a large amount of waste liquid can be discharged, and at the same time an amount of deposition of powder material in the waste in the machining liquid vessel can be reduced.

In the machining liquid processing unit in an electric discharge machine according to another aspect of the present invention, the movable shooter or flexible hose can be driven between the first position and the second position by the driving means, so that switching between an operation for returning a machining liquid discharged from the machining liquid vessel to the first storage section in the machining liquid tank and that for returning the machining liquid to the second storage section can accurately be executed, and also the switching operation can remotely be controlled.

In the machining liquid processing unit in an electric discharge machine according to another aspect of the present invention, the first machining liquid to remove machining chips therein and the second machining liquid to replace the powder material therein can be filtered with one filter, so that filters are not required to be provided discretely, which allows the cost and the space to be reduced.

Even if a liquid level of any one of the machining liquid in the first storage section and in the second storage section becomes high due to a malfunction in a step of switching the waste liquid, the height of liquid level does not become higher than the notched section because the machining liquid flows into the other storage section through a portion having the height lower than a level where the machining liquid overflows from the machining liquid tank such as a notched section provided in the central partition plate, and for this reason there is no possibility that the machining liquid overflows from the machining liquid tank onto a floor or other places.

In the machining liquid processing unit in an electric discharge machine according to another aspect of the present invention, the injection nozzle tube for agitating a machining liquid comprises an edge-less injection nozzle tube for a ring, does not include the cul-de-sac section, and powder material in a machining liquid is not deposited in the edge-less injection nozzle tube, and injection holes are not clogged therewith, so that deposition of the powder material in the injection nozzle tube is reduced with the machining liquid in the machining liquid tank sufficiently agitated, which makes an amount of powder material deposited in the machining liquid tank reduced.

In the machining liquid processing unit in an electric discharge machine according to another aspect of the present invention, even if powder material in a machining liquid is deposited in the edge-less injection nozzle tube, dynamic pressure provided by the machining liquid effects alternately on the deposited section in two reversed directions, and the deposited section is washed off, so that an injection capability of the edge-less injection nozzle tube can be prevented from the deterioration and the machining liquid can always and sufficiently be agitated in the whole machining liquid tank, and for this reason an amount of deposition of the powder material in the machining liquid tank can be reduced.

Other objects and features of this invention will become understood from the following description with reference to the accompanying drawings.

BRIEF DESCRIPTION OF DRAWINGS

5

DESCRIPTION OF THE PREFERRED EMBODIMENTS

A detailed description is made hereinafter for preferred embodiments of the present invention with reference to the related drawings. It should be noted that the same reference numerals are assigned to the same portions in the embodiments of the present invention as those in the conventional type thereof, and description thereof is omitted herein.

FIG. 1 to FIG. 5 show Embodiment 1 of a machining liquid processing unit according to the present invention. A machining liquid tank 71 is divided with a central partition plate 73 into a first storage section 75 and a second storage section 77, and a first machining liquid L1 which is based on lump oil not including therein powder material is pored into the first storage section 75, and a second machining liquid L2 which is base heating oil including therein conductive powder material is pored into the second storage section 77.

Figure 2:
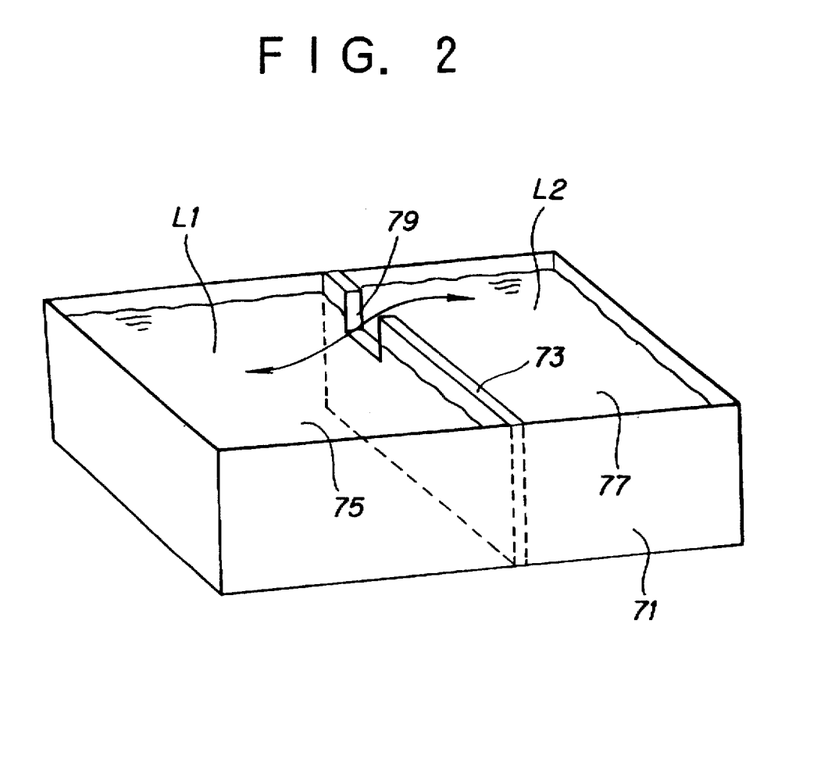
FIG. 2 is a perspective view showing one of embodiments of a machining liquid tank used in the machining liquid processing unit in an electric discharge machine according to the present invention.

As clearly shown in FIG. 2, a square-shaped notched section 79 is formed in the central partition plate 73, and the notched section 79 is a portion having the height lower than a level where the machining liquid overflows from the machining liquid tank 71, namely the upper edge of the peripheral wall of machining liquid tank 71.

Figure 1:
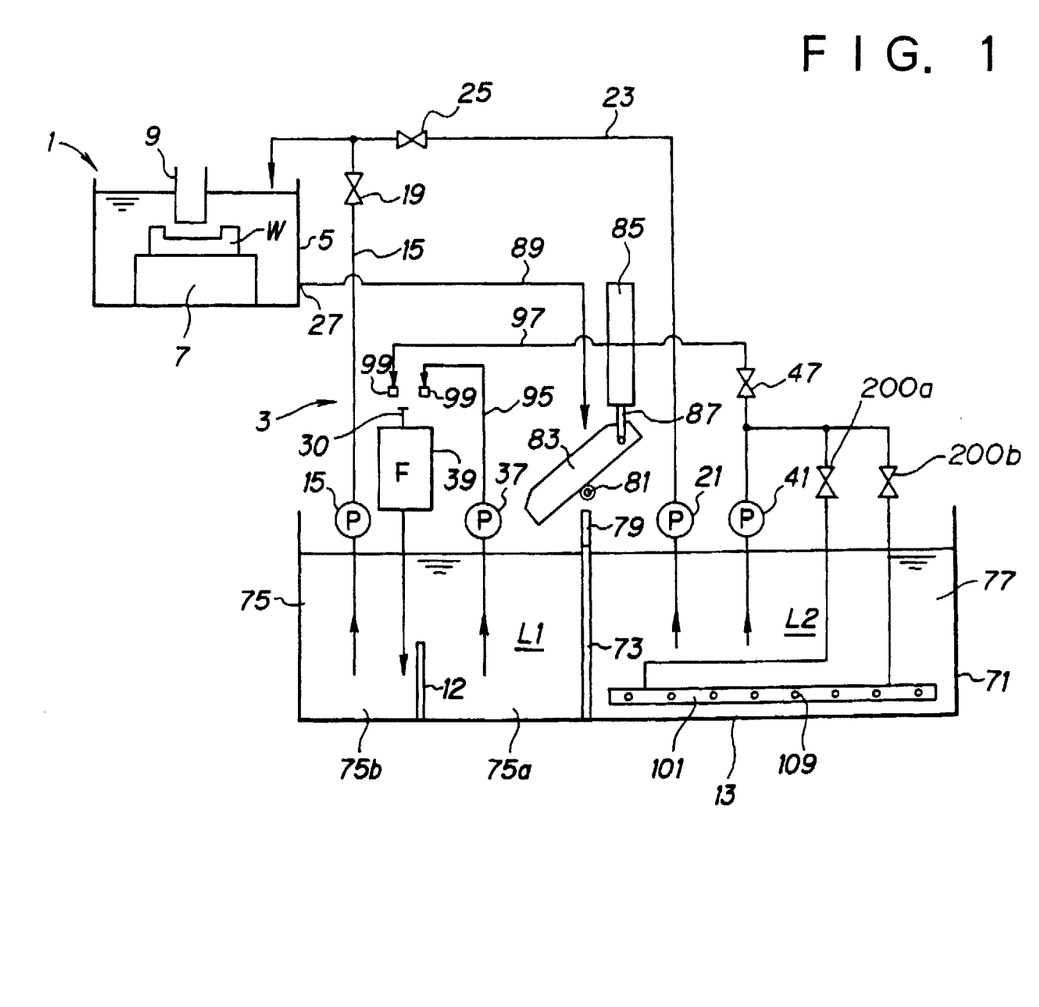
FIG. 1 is a general diagram showing Embodiment 1 of a machining liquid processing unit in an electric discharge machine according to the present invention.

The first storage section 75 is divided with an internal partition plate 12 into a contaminated liquid vessel 75a and a clean liquid vessel 75b.

Figure 4A:
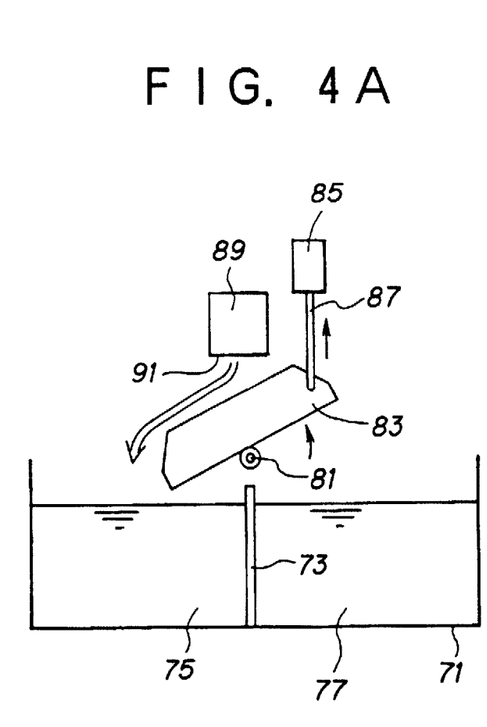
FIG. 4A is a front view showing a state where the movable shooter is in a first position.
Figure 4B:
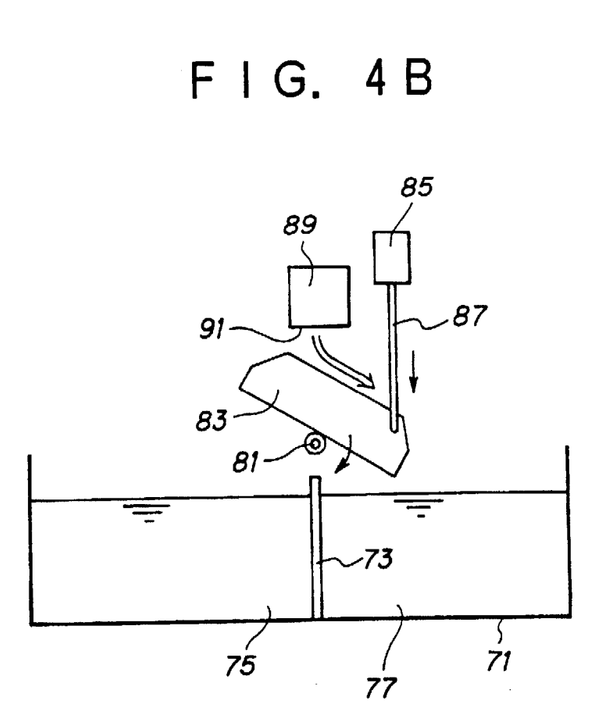
FIG. 4B is a front view showing a state where the movable shooter is in a second position.

A movable shooter 83 having a tub shape with both edges thereof opened is rotatably provided with a supporting shaft 81 above the upper section of the central partition plate 73. The central section of movable shooter 83 in the longitudinal direction thereof is rotatably supported with the supporting shaft 81 and extends therein so that a distance from each edge of the shaft is left equally to each other, and the movable shooter is reversely moved between a first position in which the shooter is inclined in the downward direction to the first storage section 75 as shown in FIG. 4A, and a second position in which the shooter is inclined in the downward direction to the second storage section 77 as shown in FIG. 4B.

6

A piston rod 87 in a fluid pressure cylinder device 85 is connected to one edge section of the movable shooter 83 so that the former is driven by the latter. The fluid pressure cylinder device 85 drives the movable shooter 83 reciprocally between the first position and the second position by up-and-down movements of the piston rod 87.

Only one machining liquid returning pipe 89 is connected to the machining liquid discharge port 27 of the machining liquid vessel 5. The other edge of the machining liquid returning pipe 89 is bent vertically in the downward direction above the central section of the movable shooter 83 in the longitudinal direction, and becomes a tap-shaped machining liquid discharging edge section 91 opposing to the central section of the movable shooter 83 in the longitudinal direction.

A tub-shaped inclined guide member 93 (Refer to FIG. 3) for receiving a machining liquid flowing down into the first storage section 75 from the movable shooter 83 is provided therein to prevent its foaming. It should be noted that an identical inclined guide member to the guide inclined member 93 may be provided in the second storage section 77.

In the machining liquid processing unit, a filter 39 is provided only in the first storage section 75. Either one of a pipe 95 led from a pump 37 and a pipe 97 led from a pump 41 is selectively and detachably connected to a machining liquid inlet port 39a of the filter 39 with a joint 99 such as a coupler.

An edge-less injection nozzle tube 101 for agitating a machining liquid is provided in the bottom section of the second storage section 77. The edge-less injection nozzle tube 101 comprises, in a square ring form as clearly shown in FIG. 5, two pieces of I-shaped joint 105 each having a machining liquid inlet port 103, four pieces of L-shaped joint 107, and six pieces of pipe 111 with injection holes each having a plurality of injection holes 109 and connected to each other with the I-shaped joint 105 and the L-shaped joint 107. The two machining liquid inlet ports 103 are positioned in the furthermost distance from each other in the square ring, and the second machining liquid L2 is alternately supplied thereto from the pump 41. Also a machining liquid is alternately supplied to the edge-less injection nozzle tube 101 according to an ON/OFF control for open/close valves 200a and 200b.

Figure 6:
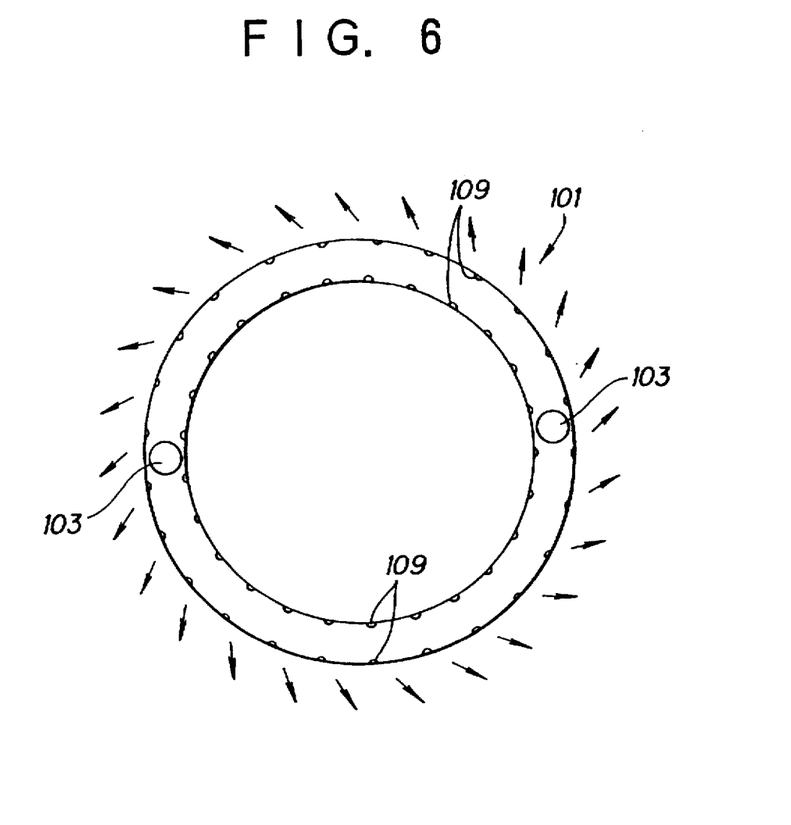
FIG. 6 is a plan view showing other embodiment of the injection nozzle tube used in the machining liquid processing unit in an electric discharge machine according to the present invention.

The edge-less injection nozzle tube 101, as shown in FIG. 6, may be a circular one other than a square ring.

Next, a description is made for operations of the machining liquid processing unit having the same configuration as that described above.

In a case where the first machining liquid L1 is used in roughing or interstage machining, the open/close valve 19 should be opened with the open/close valve 25 closed, and the first machining liquid L1 is supplied to the machining liquid vessel 5 from the clean liquid vessel 75b in the first storage section 75 by operating a pump 15.

In this step, as shown in FIG. 4A, the movable shooter 83 should be positioned in the first position by the fluid pressure cylinder device 85. Because of this operation the first machining liquid L1 discharged from the machining liquid discharge port 27 of the machining liquid vessel 5 and dropping from the machining liquid discharging edge section 91 of the machining liquid returning pipe 89 onto the central section of the movable shooter in the longitudinal direction is guided by the movable shooter 83 to flow down to the contaminated liquid vessel 75a of the first storage section 75.

Also in this step, the pipe 95 led from the pump 37 is connected to the machining liquid inlet port 39a of the filter 39 with the joint 99, the first machining liquid L1 returned to the contaminated liquid vessel 75a of the first storage section 75 is conveyed to the filter 39 by operating the pump 37, and returns to the clean liquid vessel 75b of the first storage section 75 by filtering and removing machining chips with the filter 39.

When the roughing/interstage machining is finished, the operation of the pump 15 is terminated, and the first machining liquid L1 in the machining liquid vessel 5 is discharged through the machining liquid returning pipe 89 to the contaminated liquid vessel 75a of the first storage section 75 by the movable shooter 83 positioned in the first position.

In a case where the second machining liquid L2 is used in a finishing process, the open/close valve 19 should be closed with the open/close valve 25 opened, and the second machining liquid L2 is supplied to the machining liquid vessel 5 from the second storage section 77 by operating the pump 21.

In this step, as shown in FIG. 4B, the movable shooter 83 should be positioned in the second position by the fluid pressure cylinder device 85. With this operation the second machining liquid L2 discharged from the machining liquid discharge port 27 of the machining liquid vessel 5 and dropping from the machining liquid discharging edge section 91 of the machining liquid returning pipe 89 onto the central section of the movable shooter 83 in the longitudinal direction is guided by the movable shooter 83 to flow down to the second storage section 77.

Also in this step, an open/close valve 47 should be closed, and the second machining liquid L2 in the second storage section 77 is alternately supplied to the two machining liquid inlet ports 103 provided in the edge-less injection nozzle tube 101.

Figure 5:
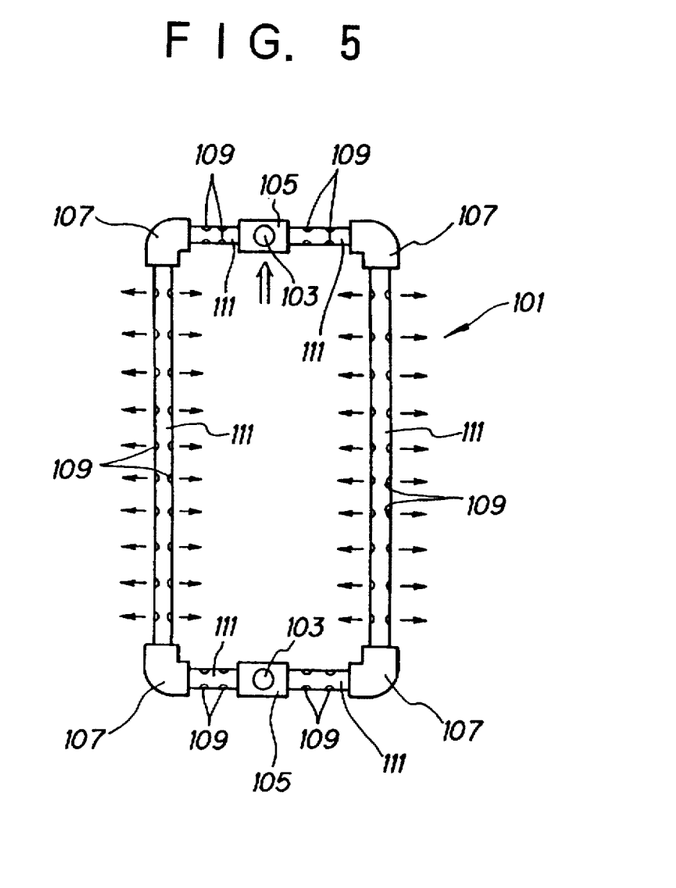
FIG. 5 is a plan view showing one of embodiments of an injection nozzle tube used in the machining liquid processing unit in an electric discharge machine according to the present invention.

With this configuration the second machining liquid L2 is injected from each injection hole 109 provided in the pipe 111 with injection holes, and with the jet described above, the second machining liquid L2 in the second storage section 77 is agitated, and deposition of the powder material mixed in the second machining liquid L2 in the bottom of the vessel is suppressed.

The edge-less injection nozzle tube 101 does not include the cul-de-sac section (plugged section), so that powder material in the second machining liquid L2 is not deposited in the edge-less injection nozzle tube 101, and any of injection holes 109 is not clogged therewith, and for this reason, the second machining liquid L2 is always and sufficiently agitated in the whole second storage section 77 without deteriorating the injections capability of the edge-less injection nozzle tube 101. Because of this feature an amount of deposition of the powder material in the second storage section 77 is reduced.

Figure 7:
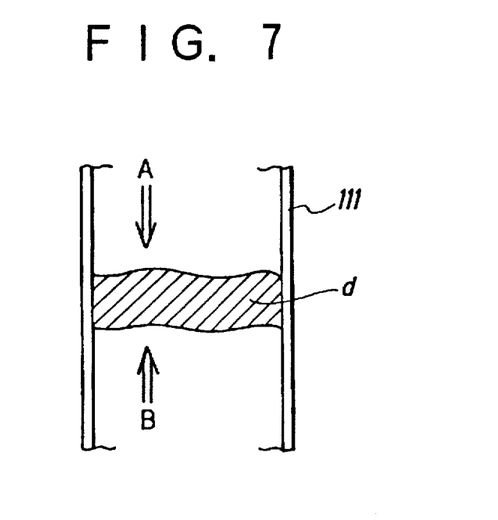
FIG. 7 is an explanatory view showing simulatedly a state where powder material is deposited in the injection nozzle tube.

The second machining liquid L2 is alternately supplied to the two machining liquid inlet ports 103, so that, as shown in FIG. 7, even if a section d with powder material deposited thereon is generated in the pipe 111 with injection holes, the dynamic pressure generated by the second machining liquid L2 flowing in the opposite directions A and B in the both sides of the section d is alternately effected and the deposited section d is washed off. Also with this feature described above, the injection capability of the edge-less injection nozzle tube 101 can be prevented from deterioration, the second machining liquid L2 can always and sufficiently be agitated in the whole second storage section 77, and an amount of deposition of powder material in the second storage section 77 is reduced.

When finishing is completed, operation of the pump 21 should be terminated, and the second machining liquid L2 in the machining liquid vessel 5 is discharged to the second storage section 77 through the machining liquid returning pipe 89 by the movable shooter 83 positioned in the second position.

As described above, in a case where a machining liquid discharged from the machining liquid vessel 5 is the first machining liquid L1, the machining liquid is returned to the first storage section 75, and in a case where it is the second machining liquid L2, the machining liquid is returned to the second storage section 77, the system can be achieved only by changing a position of the movable shooter 83 in the direction of inclination thereof, and for this reason a conventional type of an open/close valve for switching for discharge thereof is not required, and only by making larger a bore diameter of the machining liquid discharging pipe 81, a large amount of flow rate of waste liquid becomes possible. Also interference during stroke movements does not occur, and distortion of the table is not affected by the weight of the open/close valve.

By discharging a liquid in a large flow rate, an amount of deposition of powder material in the machining liquid vessel 5 during discharging the liquid can be reduced.

It should be noted that there is a possibility that two types of machining liquid are mixed when a position of the movable shooter 83 is changed, so that it is desirable that a function of a self-maintenance is given to, for instance, a channel switching valve not shown herein for switching and driving the fluid pressure cylinder device 85 to prevent the movable shooter 83 from freely rotating under abnormal conditions such as power failure.

Figure 3:
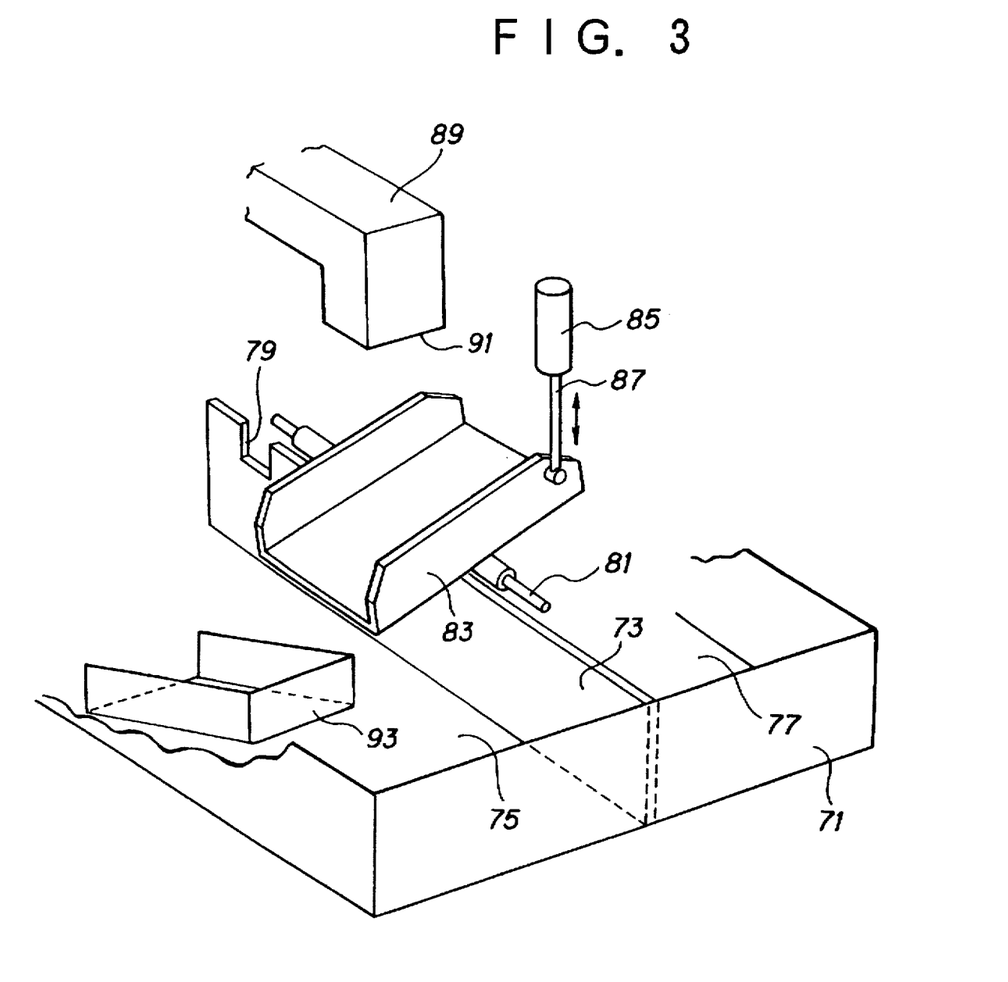
FIG. 3 is a perspective view showing a portion of a movable shooter used in the machining liquid processing unit in an electric discharge machine according to the present invention.

Also it is desirable that foaming is suppressed with the inclined guide member 93 because it can be imaged that, if the machining liquid is discharged in a large amount of flow rate, the machining liquid in the machining liquid tank is foamed when dropped from the movable shooter 83, and the foam sucked up by the pumps 15 and 21 causes the machining liquid vessel 5 to be filled therewith.

Also it is desirable that foaming is suppressed by intermittently agitating the machining liquid for several seconds for each minute because foaming of the machining liquid is supposed to occur also when the machining liquid is agitated all the time with the edge-less injection nozzle tube 101.

When a life of the powder material mixed in the second machining liquid L2 is over and the powder material is replaced with new one, the open/close valve 47 is opened, the pipe 97 led from the pump 41 is connected to the machining liquid inlet port 39a of the filter 39 with the joint 99, the second machining liquid L2 in the second storage section 77 is conveyed to the filter 39 by operating the pump 41, and the powder material in the second machining liquid L2 is filtered and removed with the filter 39.

The second machining liquid L2 filtered as described above is conveyed to the first storage section 75. With this operation the level of liquid in the first storage section 75 rises, and the liquid therein flows into the second storage section 77 through the notched section 79 provided in the central partition plate 73, which keeps the amount of stored machining liquid in balance between the first storage section 75 and the second storage section 77.

With this configuration, the filter 39 is used in common for filtering to remove machining chips in the first machining liquid L1 and for filtering to remove powder material in the second machining liquid L2, so that two filters required for the conventional type thereof are not required in the present invention, which allows cost and a space thereof to be reduced.

Although the first machining liquid L1 and the second machining liquid L2 are mixed with each other in the first storage section 75 when powder material is removed, no problem will be generated because the second machining liquid L2 from which the powder material is removed is the same oil liquid as that in the first machining liquid L1.

Connection of the pipes 95 and 97 to the filter 39 may be provided by the channel switching valve, not by the joints 99.

Even if a liquid level of any one of the machining liquid in the first storage section 75 and in the second storage section 77 becomes high due to a malfunction in a step for switching the waste liquid, the height of liquid level does not become higher than the notched section 79 because the machining liquid flows into the other storage section through the notched section 79, and for this reason there is no possibility that the machining liquid overflows from the machining liquid tank 71 onto a floor or other places.

Figure 8:
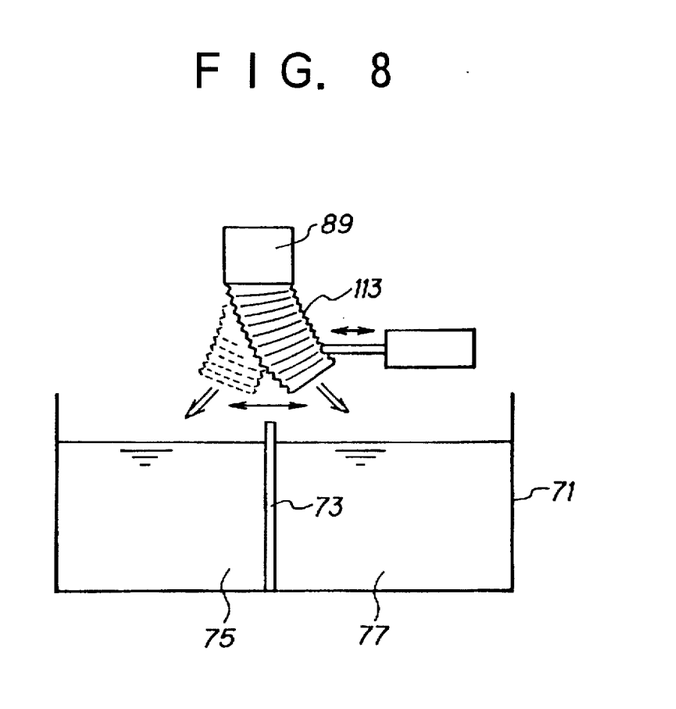
FIG. 8 is a front view showing the key configuration of Embodiment 2 of a machining liquid processing unit in an electric discharge machine according to the present invention.

FIG. 8 shows Embodiment 2 of the machining liquid processing unit according to the present invention. It should be noted that, in FIG. 8, the same reference numerals in FIGS. 4A and 4B are assigned to the portions corresponding to those in FIGS. 4A and 4B.

In this embodiment, a flexible hose 113 such as a rubber hose is communicated and connected to the edge section of the machining liquid returning pipe 89. The flexible hose 113 can elastically be deformed between a first position above the first storage section 75 where an opening edge 115 provided downwardly from the edge section is positioned and a second position above the second storage 77 where the opening edge 115 is positioned.

A piston rod 119 provided in a fluid pressure cylinder device 117 is linked with the flexible hose 113 so that the former is driven by the latter. The fluid pressure cylinder device 117 moves flexibly and reversibly the flexible hose 113 between the first position and the second position by horizontal movement of the piston rod 119.

In this embodiment, in a case where the first machining liquid L1 is returned to the first storage section 75, the flexible hose 113 is positioned at the first position by the fluid pressure cylinder device 117. Because of this feature the opening edge 115 of the flexible hose 113 is positioned above the first storage section 75, and the first machining liquid L1 is flown down from the opening edge 115 to the first storage section 75.

In contrast to the case described above, in a case where the second machining liquid L2 is returned to the second storage section 77, the flexible hose 113 is positioned at the second position by the fluid pressure cylinder device 117. Because of this feature the opening edge 115 of the flexible hose 113 is positioned above the second storage section 77, and the second machining liquid L2 is flown down from the opening edge 115 to the second storage section 77.

With this feature, also in the embodiment, an open/close valve for switching for discharge required in the conventional technology is not required, and only by making larger the bore diameter of the machining liquid discharging pipe 81 and the flexible hose 113, the waste liquid in a large amount of flow rate can easily be discharged. In addition, interference will not occur during stroke movements, and the weight of the open/close valve does not affect to the table to be distorted thereby.

This application is based on Japanese patent application No. HEI 7-265981 filed in the Japanese Patent Office on Oct. 13, 1995, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A machining liquid processing unit in an electric discharge machine selectively using a first machining liquid not containing powder material or a second machining liquid containing powder material mixed therein comprising:

a machining liquid tank having a first storage section for storing the first machining liquid therein and a second storage section for storing the second machining liquid therein;

a movable shooter, having a chute shape, movably provided between a first position where the first machining liquid is diverted to said first storage section and a second position where the second machining liquid is diverted to said second storage section, wherein each of the first and second machining liquids are discharged from a machining liquid discharge port formed in a machining liquid vessel in the electric discharge machine.

2. A machining liquid processing unit in an electric discharge machine according to claim 1, further comprising a driving means for driving said moveable shooter between said first position and said second position.

3. A machining liquid processing unit in an electric discharge machine selectively using a first machining liquid not containing powder material or a second machining liquid containing powder material mixed therein comprising:

a machining liquid tank having a first storage section for storing the first machining liquid therein and a second storage section for storing the second machining liquid therein;

a flexible hose deformably provided between a first position where the first machining liquid is diverted to said first storage section and a second position where the second machining liquid is diverted to said second storage section, wherein each of the first and second machining liquids are discharged from a machining liquid discharge port formed in a machining liquid vessel in the electric discharge machine.

4. A machining liquid processing unit in an electric discharge machine according to claim 3, further comprising a driving means for driving said flexible hose between said first position and said second position.

5. A machining liquid processing unit in an electric discharge machine selectively using a first machining liquid not containing powder material or a second machining liquid containing conductive powder material mixed therein comprising:

a machining liquid tank, inside of which is divided with a partition plate to a first storage section for storing therein a first machining liquid and a second storage section for storing therein a second machining liquid;

a filter for filtering a machining liquid and returning the machining liquid to the first storage section; and a machining liquid supply means for selectively supplying either the first machining liquid stored in said first storage section or the second machining liquid stored in said second storage section; wherein said partition plate includes a portion having the height lower than a level where the machining liquid overflows from the machining liquid tank at least at its portion, and said first storage section and said second storage section are mutually communicated to each other in the portion.

6. A machining liquid processing unit in an electric discharge machine using a machining liquid containing conductive powder material mixed therein comprising:

a machining liquid tank for storing therein said machining liquid; and an edge-less injection nozzle tube, having a ring shape, for agitating a machining liquid which injects said machining liquid from each of a plurality of injection holes into said machining liquid tank.

7. A machining liquid processing unit in an electric discharge machine according to claim 6, wherein said edge-less injection nozzle tube has two machining liquid inlet ports spaced at a certain gap, and said machining liquid is alternately supplied to these two machining liquid inlet ports.

* * * * *